United States Patent [19]

Bordewijk

[11] Patent Number: 4,918,736

[45] Date of Patent: Apr. 17, 1990

[54] REMOTE CONTROL SYSTEM FOR HEARING AIDS

[75] Inventor: Lourens G. Bordewijk, Eindhoven, Netherlands

[73] Assignee: U.S. Philips Corporation, New York, N.Y.

[21] Appl. No.: 757,693

[22] Filed: Jul. 22, 1985

[30] Foreign Application Priority Data

Sep. 27, 1984 [GB] United Kingdom ................ 8424471

[51] Int. Cl.[4] ........................ H04R 25/00; H04B 5/02; H04B 5/06

[52] U.S. Cl. ........................................ 381/68; 381/79; 340/825.72

[58] Field of Search ... 179/107 R, 107 FD, 179.2 EA; 340/825.72; 358/21 R; 379/55, 56, 63, 74, 350, 386; 381/68, 68.1–68.7, 79, 105

[56] References Cited

U.S. PATENT DOCUMENTS

| | | | |
|---|---|---|---|
| 3,046,798 | 7/1962 | Igarashi | 455/351 |
| 3,423,725 | 1/1969 | Harwood | 367/197 |
| 3,894,195 | 7/1975 | Kryter | 381/68.4 |
| 4,061,972 | 12/1977 | Burgess | 381/107 |
| 4,100,568 | 7/1978 | Kline | 358/21 R |
| 4,121,198 | 10/1978 | Tsuboi et al. | 340/825.75 |
| 4,188,667 | 2/1980 | Graupe et al. | 381/68.4 |
| 4,189,713 | 2/1980 | Duffy | 367/197 |
| 4,236,523 | 12/1980 | Gruenenwald | 128/419 PT |
| 4,259,547 | 3/1981 | Valley et al. | 381/23.1 |
| 4,297,677 | 10/1981 | Lewis et al. | 340/566 |
| 4,368,459 | 1/1983 | Sapora | 340/407 |
| 4,400,590 | 8/1983 | Michelson | 381/68.2 |
| 4,415,065 | 11/1983 | Sandstedt | 340/825.44 |
| 4,459,584 | 7/1984 | Clarkson | 340/539 |
| 4,585,903 | 4/1986 | Schiller et al. | 381/62 |
| 4,596,899 | 6/1986 | Wojcik et al. | 381/68.4 |
| 4,608,459 | 8/1986 | Nakamura et al. | 379/73 |
| 4,628,907 | 12/1986 | Epley | 381/68.3 |
| 4,689,820 | 8/1987 | Köpke et al. | 381/68 |

FOREIGN PATENT DOCUMENTS

| | | | |
|---|---|---|---|
| 1938381 | 2/1971 | Fed. Rep. of Germany . | |
| 2407726 | 8/1975 | Fed. Rep. of Germany . | |
| 3139088 | 4/1983 | Fed. Rep. of Germany | 381/101 |
| 659728 | 6/1960 | Italy | 381/68 |
| 1252411 | 11/1971 | United Kingdom | 381/68 |
| 1565701 | 4/1980 | United Kingdom | 381/68 |

OTHER PUBLICATIONS

"Special Hearing System", *Sound and Communications*, Sep. 1982.

*Primary Examiner*—Jin F. Ng
*Assistant Examiner*—Danita R. Byrd
*Attorney, Agent, or Firm*—Bernard Franzblau

[57] ABSTRACT

The remote control of an operational parameter, such as the amplification factor (A) of the amplifier (19), of a hearing aid (1) occurs via a control signal in the form of acoustic waves (11) transmitted by a transmitter (10) of a remote control unit (2) and received by a pick-up (15) of the hearing aid (1). The acoustic waves can be ultrasonic waves or modulated waves and make it possible to reduce the size of the hearing aid, resulting in a more compact device that can easily be controlled remotely, for example, by means of a manually adjustable volume control located in the remote control unit.

10 Claims, 1 Drawing Sheet

REMOTE CONTROL SYSTEM FOR HEARING AIDS

BACKGROUND OF THE INVENTION

This invention relates to a combination of a hearing aid adapted to be supported upon the head of a user of the aid, and a remote control unit. In a known combination of the aforesaid type the remote control unit comprises, control means, that can be operated manually by the user, an encoder unit having an input coupled to the control means and an output, and a transmitter having an input coupled to the output of the encoder unit. The encoder unit is adapted to convert control operations carried out by the user of the control means into a first control signal and to apply this first control signal via its output to the transmitter, for the wireless transmission of the first control signal. The hearing aid comprises a pick-up for receiving the first control signal transmitted by the transmitter of the remote control unit, a decoder unit having an input coupled to the pick-up for receiving the first control signal and an output, the decoder unit being adapted to convert the first control signal into a second control signal for controlling at least one operational parameter of the hearing aid. The invention further relates to a remote control unit and a hearing aid for use in the type of combination. The combination described in the opening paragraph is known from German Offenlegungsschrift 1.938.381.

Headworn hearing aids of the eyeglass, behind-the-ear, in-the-ear or in-the-earcanal type generally contain a miniature microphone and a miniature receiver as well as an electronic amplifier for signal amplification and/or filtering.

With hearing aids becoming ever smaller as well as more reliable, the on-off switch and the volume control are becoming more and more of a problem. Manipulation of the ever smaller buttons, especially for elderly people, is a problem, while the switches and controls are generally the weakest part of the aid and more than other elements of aids are subject to the environmental conditions.

A solution for the problems described above can be found in the above-mentioned German Offenlegungsschrift 1.938.381. By means of the inductive coupling between coils in the remote control unit and the hearing aid it is possible to change the operational parameters of the aid, such as switching the aid on and off, changing the amplification factor of the amplifier or amending the frequency response characteristics of the aid.

However, coils occupy a large amount of space, which is sometimes not even available, such as in the in-the-earcanal type. This means that the hearing aids are either very bulky, or it is not even possible to apply a remote control to the aid, which remote control can hardly be dispensed with in the in-the-ear canal type of hearing aid.

SUMMARY OF THE INVENTION

The invention aims at providing another way of realizing the remote control of the hearing aid, such that the hearing aids can remain rather small and occupy a smaller amount of space, which means that the remote control of the in-the-ear canal type hearing aid will be possible. To that purpose the combination is characterized in that the wireless transmission of the first control signal takes place by means of acoustic waves.

The invention is based on the recognition that the transmission of acoustic waves makes it possible to use a pick-up in the form of an acousto-electric transducer. Such transducers can be smaller than a coil so that a saving of space can be obtained.

The invention describes a system to control a hearing aid remotely by means of a hand-held device which is brought in the vicinity of or held against the hearing aid concerned. Control is through more or less simple sound signals originated by the handheld unit and received by the pick-up of the hearing aid.

Especially in a hearing aid comprising a series arrangement of a microphone, an amplifier and an electro-acoustic transducer, the said microphone can function as the pick-up for receiving the first control signal. In this case, no additional element for the pick-up is needed, which realizes an even larger saving of space so that the hearing aid can be even smaller. Furthermore, a saving in energy can be obtained because there is one transducer now instead of two for receiving the speech signals and the control signal. However, this means that filter means are needed for deriving the first control signal from the output signal of the microphone, an output of the filter means being coupled to the input of the decoder unit.

The first control signal can lie in a frequency region which is outside the operating frequency range of the receiver. In this case, one makes use of the general characteristic of modern miniature transducers which enable miniature microphones to be made much more wideband (say up to 12, 15 or 20 kHz) than receivers (hearing aid telephones) which, because of their own frequency characteristic as well as the influence of the acoustic coupling of the earcavity to the receiver, in general does not extend beyond 6 or 7 kHz.

This difference in bandwidth is used to bring the first control signal into the hearing aid to switch the aid on or off, or to change volume, frequency-settings or other operational parameters of the aid, without disturbing the user of the aid.

The first control signal is simply picked up by the microphone but cannot be reproduced by the receiver electro-acoustic transducer because the frequency of the first control signed is outside of the transducer frequency response characteristic.

It should be noted that if a remote control of the on/off function of the hearing aid is contemplated, the pick-up—and in those cases where the microphone of the hearing aid functions as the pick-up, the microphone—as well as the decoder unit in the hearing aid should be permanently switched on.

The wireless transmission of the first control signal can take place by means of ultrasonic waves. This means that the frequency of these waves lie outside the frequency range of normal hearing.

It should be noted here that the wireless transmission of signals by means of ultrasonic waves is known per se from German Gebrauchsmuster 73.11.755. However said Gebrauchsmuster concerns the wireless transmission of audio information from an audio system to a headphone. This means that it does not describe the wireless transmission of a control signal for the remote control of an operational parameter of a hearing aid.

Another possibility is that the wireless transmission occurs via modulated acoustic waves. This makes the combination less sensitive to disturbing acoustic signals originating from other sources. The first control signal can be transmitted in amplitude-modulated or frequency-modulated form. This means that the encoder unit in the remote control unit comprises a modulator in order to modulate the control signal, and the decoder unit in the hearing aid comprises a demodulator in order to demodulate the control signal received.

However, it should be noted here that other encoding techniques can alternatively be applied, such as an encoding procedure based on tone combinations (e.g. the so-called "dual tone multi-frequency" system, as applied in the transmission of dialling information over telephone lines).

BRIEF DESCRIPTION OF THE DRAWING

The following description describes the invention in more detail with reference to the accompanying drawing. In the drawings.

DESCRIPTION OF THE PREFERRED EMBODIMENTS

Figure 1:
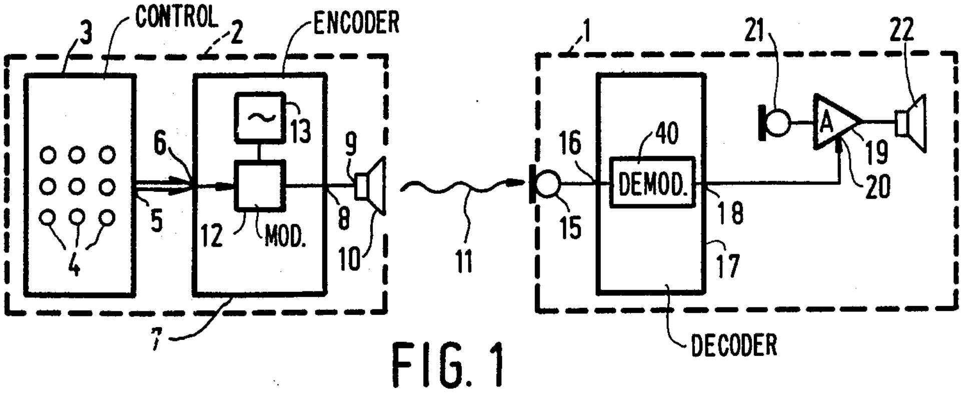
FIG. 1 shows a first embodiment of the invention that includes the combination of a hearing aid and a remote control unit.

FIG. 1 shows an embodiment of the combination of a hearing aid 1 and a remote control unit 2, both elements being shown only schematically in the form of block diagrams. The remote control unit 2 comprises control means 3, having control buttons 4. The output 5 of the control means 3 is coupled to an input 6 of an encoder unit 7. An output 8 of the encoder unit 7 is coupled to an input 9 of a transmitter 10, which is in the form of a loudspeaker. The encoder unit is adapted to convert control operations carried out by a user of the hearing aid on the control means 3 into a first control signal and to apply the first control signal via its output 8 to the transmitter 10, for the wireless transmission of the first control signal. The wireless transmission takes place by means of acoustic waves 11. The transmission can also take place by means of ultrasonic waves. In that case the transducer 10 is an ultrasonic transducer.

The transmission of the first control signal can alternatively take place by means of modulated acoustic waves. In that case, the encoder unit 7 comprises a modulator 12 and an oscillator 13. Operating a button 4 of the control means 3 influences either the frequency of the oscillator, or the amplitude of the oscillator, in which case one obtains a frequency-modulated or an amplitude-modulated signal at the output 8 of the encoder unit 7.

The hearing aid 1 comprises a pick-up 15 for receiving the acoustic waves 11 transmitted by the transmitter 10 of the remote control unit 2. The first control signal is received and is fed to an input 16 of a decoder unit 17. The decoder unit 17 is adapted to convert the first control signal into a second control signal for controlling at least one operational parameter of the hearing aid 1. In the present case the second control signal controls the amplification factor A of an amplifier 19 in the hearing aid. To that purpose the output 18 of the decoder unit 17 is coupled to a control input 20 of the amplifier 19.

The hearing aid generally comprises a microphone 21 for converting received speech waves etc. into corresponding electric audio signals. The microphone is coupled via the amplifier 19 to a loudspeaker (or telephone) 22.

The decoder unit 17 comprises a demodulator 40 to demodulate the first control signal if it is transmitted in frequency- or amplitude-modulated form.

It will be evident that between successive manipulations of the buttons on the remote control unit 2 the value of the second control signal should remain at the level as adjusted. To that purpose the decoder unit 17 comprises a memory in which the level of the second control signal can be stored after each manipulation of a button on the remote control unit 2.

Figure 2:
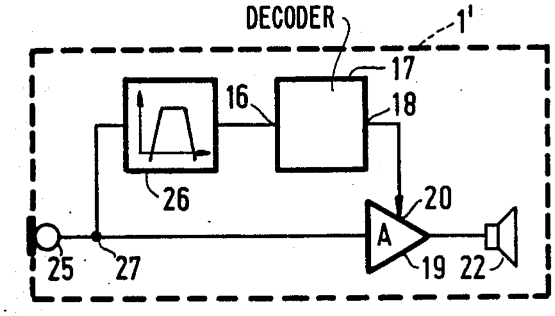
FIG. 2 shows another embodiment of the hearing aid in the combination.

FIG. 2 shows another embodiment of the hearing aid, denoted by the reference numeral 1'. The pick-up 25 also functions as the microphone of the hearing aid. This means that the output of the pick-up 25 is also coupled to the input of the amplifier 19. Filter means 26 are included between the microphone 25 and the decoder unit 17 in order to derive the first control signal from the output signal of the microphone 25. The filter means 26 can include a band-pass filter covering that frequency range in which the frequency of the first control signal lies. Because, in general, the telephone 22 exhibits, because of its acoustic coupling to the ear cavity, a limited operating frequency range, up to say 6 or 7 kHz, compared to the operating frequency range of the microphone 25, which is say up to 12, 15 or 20 kHz, one can modulate the first control signal into the frequency region above 7 kHz and below the upper limit frequency of the operative frequency range of the microphone. As a result of the limited frequency passband of loudspeaker 22, a bandstop filter is not needed in the connection between the point 27 and the amplifier 19 to prevent the first control signal from being reproduced by the telephone 22. The embodiment of FIG. 2 again shows a control of the amplification factor A of the hearing aid amplifier 19.

Figure 3:
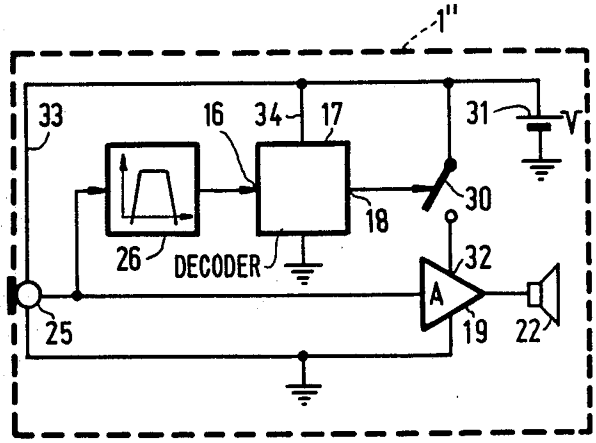
FIG. 3 shows yet another embodiment of the hearing aid in the combination.

FIG. 3 shows an embodiment of a hearing aid 1'' in which the on-off switch 30 can be manipulated remotely. Switching the on-off switch 30 on allows a supply voltage V from a battery 31 (incorporated in the hearing aid) to be fed to the power supply terminal 32 of the amplifier 19 of the aid. In order for the remote control to function properly in switching the hearing aid on and off, the microphone 25 and the decoder unit 17 are permanently coupled to the supply voltage V by means of the connections 33 and 34. The same is true for the band-pass filter 26 if it is an active filter.

It is evident that, in addition to the remote control of the on-off switch 30, other operational parameters such as the amplification factor A, as described with reference to FIGS. 1 and 2, can be controlled remotely. This implies that a plurality of first control signals having different frequencies or different codes are used, transmitted via acoustic waves having different frequencies or different codes, picked up by the pick-up and converted in the decoder unit into more than one second control signal to control the relevant operational parameters of the hearing aid.

What is claimed is:

1. A combination of a hearing aid adapted to be supported upon the head of a user of the aid, and a remote control unit, the remote control unit comprising, control means for manual operation by the user of the hearing aid, an encoder unit having an input and an output and with the input coupled to the control means, the encoder unit being adapted to convert control operations carried out by the user of the control means into a first control signal and to apply said first control via its output to an input of a transmitter, said transmitter providing wireless transmission of the first control signal by means of acoustic waves, the hearing aid comprising, a microphone pick-up for receiving the acoustic wave first control signal transmitted by the transmitter of the remote control unit, a series arrangement of the microphone, an amplifier and a loudspeaker, filter means coupled to an output of the microphone for deriving the first control signal from an output signal of the microphone, and an output of the filter means being coupled to an input of a decoder unit which receives the first control signal, the decoder unit being adapted to convert the first control signal into a second control signal at its output for controlling at least one operational parameter of the hearing aid.

2. A combination as claimed in claim 1, characterized in that the wireless transmission of the first control signal comprises ultrasonic waves.

3. A combination as claimed in claim 1, characterized in that the encoder unit includes a modulator whereby the wireless transmission of the first control signal comprises modulated acoustic waves.

4. A combination as claimed in claim 1, characterized in that the first control signal lies in a frequency range which is outside the operating frequency range of the loudspeaker.

5. A combination as claimed in claim 3, characterized in that the encoder unit in the remote control unit comprises a modulator and the decoder unit in the hearing aid comprises a demodulator.

6. A combination as claimed in claim 1 characterized in that the transmitter comprises a transducer for the conversion of electric signals into acoustic signals.

7. A combination as claimed in claim 1 characterized in that the pick-up comprises a transducer for the conversion of acoustic signals into electric signals.

8. A combination as claimed in claim 1 wherein said one operational parameter comprises the amplification factor of the amplifier, and wherein the decoder unit second control signal controls said amplification factor in accordance with the manual operation of the control means in the remote control unit by the user of the hearing aid.

9. A combination as claimed in claim 1 wherein the decoder unit second control signal controls an on/off switch in the hearing aid for applying a DC operating voltage to said amplifier under control of the manual operation of the control means in the remote control unit by the user of the hearing aid.

10. A combination as claimed in claim 9 further comprising means for applying the DC operating voltage to the decoder unit independently of the state of said on/-off switch.

* * * * *